United States Patent

[11] 3,626,032

| [72] | Inventor | William P. Norris<br>China Lake, Calif. |
|---|---|---|
| [21] | Appl. No. | 723,908 |
| [22] | Filed | Apr. 24, 1968 |
| [45] | Patented | Dec. 7, 1971 |
| [73] | Assignee | The United States of America as represented by the Secretary of the Navy |

[54] PREPARATION OF POLY-$\alpha,\alpha,2,3,5,6$,-HEXAFLUORO-P-XYLYLENE
3 Claims, No Drawings

[52] U.S. Cl. ........................... 260/91.5,
117/124, 117/128.4, 117/155, 167/22, 260/465, 260/515, 260/650
[51] Int. Cl. .......................................................... C08f 3/00
[50] Field of Search .......................................... 260/91.5

[56] References Cited
UNITED STATES PATENTS

| 2,475,423 | 5/1949 | Dickey et al. | 260/91.5 |
|---|---|---|---|
| 2,651,627 | 9/1953 | Prober | 260/91.5 |
| 3,268,599 | 8/1966 | Chow | 260/91.5 |
| 3,274,265 | 9/1966 | Tatlow et al. | 260/91.5 |
| 3,274,267 | 9/1966 | Chow | 260/91.5 |
| 3,280,083 | 10/1966 | Butler et al. | 260/91.5 |
| 3,360,574 | 12/1967 | Ballester et al. | 260/91.5 |

*Primary Examiner*—Harry Wong, Jr.
*Attorneys*—George J. Rubens, Roy Miller and Victor C. Muller ABSTRACT: A method for the preparation of new highly fluorinated p-xylylene monomers and polymers which have excellent chemical and thermal properties.

PREPARATION OF POLY-α,α,2,3,5,6,-HEXAFLUORO-P-XYLYLENE

SUMMARY OF THE INVENTION

This invention relates to a new fluorinated p-xylene polymer and to the process for the preparation thereof.

The chemical and thermal stability exhibited by the paraxylene polymer family has prompted various efforts to prepare new and improved compounds of this group on a simple and practical scale. The present invention provides a new fluorinated p-xylene polymer which has good thermal stability.

SUMMARY OF THE INVENTION

This invention is for poly-α,α,2,3,5,6-hexafluoro-p-xylene and the synthesis thereof. The general purpose of this invention is to provide a new fluorinated p-xylene polymer which is heat stable to temperatures of over 400° C. Another object is to provide a polymer which is useful as a coating for mirrors, metals, and surfaces which are subject to high temperatures. Other objects, features, and many of the attendant advantages of this invention will become readily appreciated as the same become better understood by reference to the following detailed description.

DESCRIPTION OF THE INVENTION

In accordance with the present invention poly-α,α,2,3,5,6-hexafluoro-p-xylene, having the following repeating unit,

is produced by the process which comprises forming a reactive intermediate or precursor, 2,3,5,6,7,7-hexafluoro-p-quinodimethane, which has the structural formulas

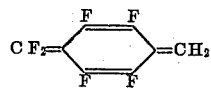

By heating potassium (4-trifluoromethyl-2,3,5,6-tetrafluorophenyl)acetate in a bath at 250° C. which had been evacuated to a pressure of 0.01 mm. of Hg gases of the precursor were formed which when led through a condenser cooled with Dry Ice formed a thin film of the polymer, poly-α,α,2,3,5,6-hexafluoro-p-xylene, on the inside of the condenser tube. The film was removed by wetting with acetone. It was 0.04 mm. thick, clear and pliable and when a small sample was held at 500° C. for 20 minutes, it showed only a small weight loss.

The polymer can be readily recovered from the condensation polymerization zone by any convenient means depending on the particular zone employed. Where a cold surface, such as a condenser, is employed as the polymerization zone the polymer is removed from the wall of the polymerization zone by mechanically stripping it off after simply wetting it with a solvent such as acetone. It is not to be implied that the polymer of this invention has to be removed or recovered from the depositing surface since it is simple and easy to place the surface or substrate to be coated within or as part of the polymerization zone. Small articles of various shapes can be protected or encapsulated with the present polymer and deposition of the polymer on continuously moving surfaces of metal, paper, glass or the like can readily be accomplished within the deposition zone.

The following reaction sequence used for the preparation of this polymer is as follows:

Add 22.6 grams (0.20 mole) of ethyl cyanoacetate to 5.0 grams (0.21 mole) of sodium hydride suspended in 75 milliliters of dimethylformamide keeping the reaction temperature at 25° C. ±5°. When hydrogen evolution ceases, 23.6 grams (0.10 mole) of octafluorotoluene is added while maintaining the temperature at 25° C. ±5°. The reaction mixture is poured into 300 milliliters of ice water and extracted with 100 milliliters of ether. The ether phase is discarded. Next, add 30 milliliters of concentrated hydrochloric acid to the aqueous phase and extract with 3–50 milliliter portions of ether. Evaporation of the ether and distillation of the residue gives 28 grams of ethyl(4-trifluoromethyl-2,3,5,6-tetrafluorophenyl)cyanoacetate which has the structural formula

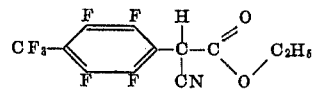

The yield is 85 percent, b.p. 107°–113° at 1.5 mm. pressure, and m.p. is 48°–51° C. An elemental analysis gave the following for $C_{12}H_6F_7NO_2$:

Calculated: C=43.78; H=1.84; F=40.40; N=4.26
Found: C=44.08; H=2.08; F=39.86; N=4.67

Twenty-eight grams of the compound formed by the process described hereinbefore, ethyl(4-trifluoromethyl-2,3,5,6-tetrafluorophenyl)cyanoacetate, was added to 50 milliliters of water, 50 milliliters of acetic acid and 80 milliliters of sulfuric acid and the mixture was heated at reflux for 5 hours. The mixture was poured into 500 milliliters of water and cooled to 5° C. overnight. The solid was filtered off to give 20 grams of a product having a m.p. of 60°–70° C. Recrystallization from n-hexane gave 18 grams of (4-trifluoromethyl-2,3,5,6-tetrafluorophenyl)acetic acid having the structural formula

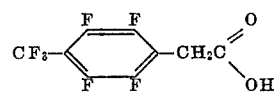

The m.p. is 77°–80° C. An elemental analysis gave the following for $C_9H_3F_7O_2$:

Calculated: C=39.15; H=1.09; F=48.17
Found: C=39.04; H=1.22; F=49.52

About 4.7 grams (0.017 mole) of the (4-trifluoromethyl-2,3,5,6-tetrafluorophenyl)acetic acid was suspended in 25 milliliters of water, two drops of phenolphthalein indicator solution was added, then a 50 percent potassium hydroxide solution was added to give a faint pink end point. The water was removed under reduced pressure at 25° C. The dry residue was dissolved in 15 milliliters of acetone, filtered, and heated to boiling. Ethylene dichloride was added to the cloud point. Cooling gave 5.0 grams (93 percent yield) white needles having a melting point of 222C. The salt was heated at 100° C. for 5 hours at 0.001 mm. pressure and the product, potassium (4-trifluoromethyl-2,3,5,6-tetrafluorophenyl)acetate, having the structural formula

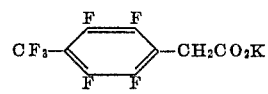

was analyzed with the following results for $C_9H_2F_7O_2K$:

Calculated: C=34.40; H=0.64; F=42.33; M=12.44
Found: C=34.20; H=0.57; F=42.37; K=12.48

Two grams of potassium (4-trifluoromethyl-2,3,5,6-tetrafluorophenyl)acetate, prepared by the method described hereinbefore, was evacuated to a pressure of 0.01 mm. and was heated in a 250° C. bath. The monomer, identified as 2,3,5,6,7,7-hexafluoro-p-quinodimethane, was emitted as a gas which when led through a condenser cooled with Dry Ice formed a thin film which was isolated and characterized as the polymer, poly-α,α,2,3,5,6-hexafluoro-p-xylylene. The film removed by wetting with acetone was 0.04 mm. thick, clear, and pliable. An X-ray diffraction pattern on the film dried at 100°/0.001 mm. showed definite lines indicating crystallinity. The sample polymer was held at 500° C. for 20 minutes and showed a 17 percent weight loss. A differential thermal analysis under nitrogen shows a small endothermic process starting at 421° C. An elemental analysis was made as follows for $(C_8H_2F)_n$:

Calculated: C=45.30; H=0.95; F=53.75
Found: C=45.17; H=0.83; F=53.71

The products formed in the various steps described in the reaction process herein are not only valuable as chemical intermediates or precursors of the synthesis of the high-temperature polymer used in coating various substrate surfaces, but are valuable for the preparation of toxic substances such as insecticides and fungicides.

While the invention has been described in detail and with particularity, it should be understood that changes and modifications may be made to the process steps described herein without departing from the scope and spirit of the invention as contained in the appended claims.

The invention herein described may be manufactured and used by or for the Government of the United States of America for governmental purposes without the payment of any royalties thereon or therefore.

What is claimed is:

1. A method for the preparation of a fluorinated p-xylylene polymer having the structural formula

wherein $n$ represents a repeating unit which comprises the steps of
   a. heating under vacuum at a pressure of about 0.01 mm. Hg a compound having the structural formula

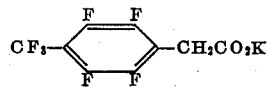

to a temperature of about 250 ° C. for a time sufficient to cause a gas to form having the structural formula

b. cooling said gas thereby condensing the gas and forming said p-xylylene polymer.

2. The method as defined in claim 1 wherein the gas is cooled and condensed on a substrate surface thereby coating said surface with said polymer.

3. The polymer prepared in accordance with claim 1 having the structural formula

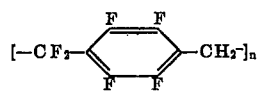

wherein $n$ represents a repeating unit.

* * * * *